United States Patent
Kohlhoff

(10) Patent No.: US 11,189,095 B1
(45) Date of Patent: Nov. 30, 2021

(54) VIRTUAL OBJECT POSITIONING IN AUGMENTED REALITY APPLICATIONS

(71) Applicant: SAP SE, Walldorf (DE)

(72) Inventor: Stephan Kohlhoff, Darmstadt (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/141,449

(22) Filed: Jan. 5, 2021

(51) Int. Cl.
*G06T 19/00* (2011.01)
*G06T 17/20* (2006.01)
*G06T 19/20* (2011.01)

(52) U.S. Cl.
CPC .......... *G06T 17/20* (2013.01); *G06T 19/006* (2013.01); *G06T 19/20* (2013.01)

(58) Field of Classification Search
None
See application file for complete search history.

(56) References Cited

U.S. PATENT DOCUMENTS

2018/0350056 A1* 12/2018 Cardenas Bernal .... G06T 7/001

* cited by examiner

*Primary Examiner* — Nicholas R Wilson
(74) *Attorney, Agent, or Firm* — Buckley, Maschoff & Talwalkar LLC

(57) ABSTRACT

Systems and methods include determination of a first component of a set of components under assembly in a physical environment, determination of a first physical position of a user with respect to the first component in the physical environment, determination of a second component of the set of components under assembly based on assembly information associated with the set of components, determination of three-dimensional surface data of the second component, determination of a physical relationship between the first component and the second component based on a model associated with the set of components, determination of a graphical representation of the second component based on the first physical position of the user with respect to the first component, the physical relationship between the first component and the second component, and the three-dimensional surface data of the second component, and presentation of the graphical representation to the user in a view including the first component in the physical environment, wherein the presented graphical representation appears to the user to be in the physical relationship to the first component.

12 Claims, 9 Drawing Sheets

US 11,189,095 B1

VIRTUAL OBJECT POSITIONING IN AUGMENTED REALITY APPLICATIONS

BACKGROUND

Augmented Reality (AR) systems allow a user to view a surrounding physical environment while also viewing displayed information and/or graphical representations of objects. The information and/or graphical representations (hereinafter referred to as "virtual objects") are typically displayed so as to appear physically present within the physical environment. An AR system may provide a transparent screen through which the user may view the surrounding physical environment and upon which virtual objects may be simultaneously displayed.

Proper positioning of a virtual object within a user's field of view requires knowledge of the user's position (e.g., head location and orientation) within the physical environment. Conventional systems address this requirement by placing a marker on a physical object on or around which a virtual object is to be positioned. The marker is recognized via a camera or other sensor of an AR system (e.g., an AR headset), and the location and orientation of the marker (and the physical object) with respect to the AR system is determined. The AR system then determines the size, position and orientation of the virtual object to be displayed based on the determined location and orientation.

Marking requires placement of one or more markers on the physical object so that at least one marker is visible from all potential viewing angles. Such marking is difficult to achieve during manufacturing and assembly of a product because the external profile of the product changes as the product is manufactured/assembled. In particular, markers placed on certain parts of the product would become hidden as other parts are added to the product, and adding markers to each part may be prohibitively inefficient in the case of a multi-part product.

Other environment-tracking methods may be employed as an alternative to marking. For example, an AR system may scan the environment and perform object recognition to detect the position of a physical object to which a virtual object is to be adjacently displayed. Object recognition is not feasible in the case of complex and changing physical object geometries such as those typically presented during product manufacturing/assembly. Object recognition is particularly impractical in the case of an AR system having relatively limited processing capabilities, such as an AR headset.

Systems for efficiently positioning virtual objects with respect to physical objects in an AR environment are desired.

DETAILED DESCRIPTION

The following description is provided to enable any person in the art to make and use the described embodiments and sets forth the best mode contemplated for carrying out some embodiments. Various modifications, however, will be readily-apparent to those in the art.

Embodiments may operate to support the physical assembly of a set of components, hereinafter referred to as a "product", using AR technology. Generally, based on data representing the three-dimensional surfaces of each component of the product and on a known sequence for assembling the components, embodiments may generate and display a virtual representation of a next component to be added to a physical partially-assembled product. The virtual representation is displayed in an AR environment so as to appear at the location and in the orientation in which the component is to be added to the physical partially-assembled product in the physical environment.

The location, orientation, size and shape of the virtual representation are calculated based on a current position of the viewer and on a current physical profile of the partially-assembled product. The current physical profile is determined based on the three-dimensional surface data of the components which are currently present in the partially-assembled product. Notably, this approach does not rely on markers to determine placement of a next component. Moreover, implementations of some embodiments may require relatively modest computing resources and may therefore be suitable for portable computing devices (e.g., an AR headset).

Figure 1:
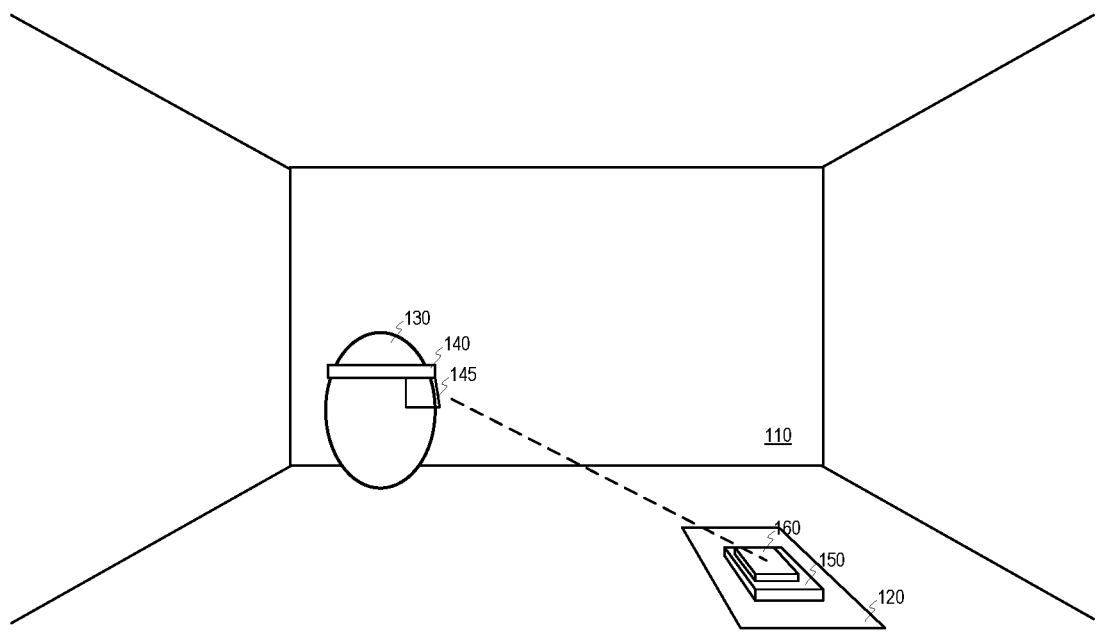
FIG. 1 is a view of a physical environment including physical objects and an AR system according to some embodiments.

As an initial introduction to some embodiments, FIG. 1 illustrates physical environment 110. Environment 110 may comprise any type of physical location including any number or type of physical objects. According to some embodiments, environment 110 is a manufacturing plant, but embodiments are not limited thereto.

Environment 110 includes base 120 which may comprise a carrier, platform, etc. and may be fixed or movable. Base 120 is intended to provide a dedicated area upon which a product may be assembled. Some embodiments do not require a dedicated area such as base 120.

Viewer 130 is physically-present within environment 110 and is intended to perform steps to assemble a product using multiple components. Viewer 130 wears AR headset 140, which includes display 145. Display 145 may be at least partially transparent and may be capable of presenting images thereon. Viewer 130 may therefore view physical elements of environment 110 through display 145 of headset 140 while simultaneously viewing virtual objects presented on display 145, such that the virtual objects appear to be present with environment 110. Embodiments are not limited to an AR headset or to an AR headset configured as illustrated in FIG. 1. In one non-exhaustive example, embodiments may be implemented using a tablet computer.

As will be described below and illustrated in subsequent figures, base 120 may include a marker which is detected by headset 140 and used to determine a position of viewer 130 with respect to base 120. This position is then used to assist in placement of component 150 on base 120. Next, using inventive features to be described in detail below, component 160 is placed on component 150.

FIG. 1 illustrates a period during product assembly at which a component is to be added to already-assembled components 150 and 160. The component to be added is determined based on known assembly data and three-dimensional surfaces of the component are determined based on known component surface data.

Sensors of AR headset 140 detect already-assembled components 150 and 160 and, using known surface data of components 150 and 160, determine a position of viewer 130 with respect to components 150 and 160. Based on this position and the known three-dimensional surfaces of the component to be added, AR headset 140 determines a three-dimensional graphical representation of the component (i.e., a virtual object). The representation depicts the component as it would appear to viewer 130 if the component were properly installed with respect to components 150 and 160, based on a known model of the product and on the assembly data. More particularly, determination of the graphical representation does not rely on markers as described in the Background, but on the known component surface data, physical relationships between components, and assembly data.

Figure 2:
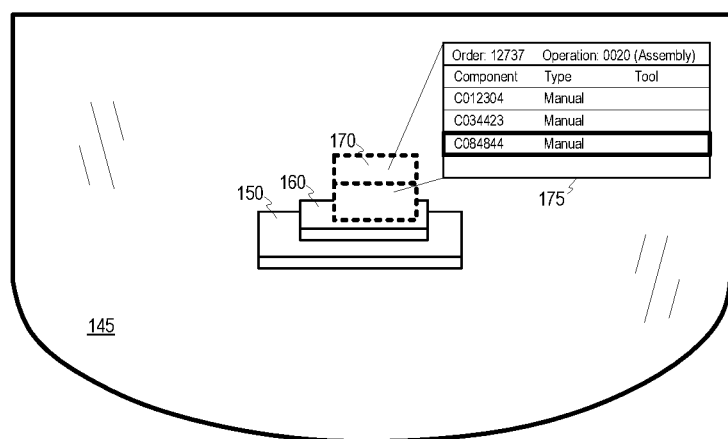
FIG. 2 is a view of an AR display presenting physical and virtual objects within an AR environment according to some embodiments.

FIG. 2 illustrates an example of three-dimensional graphical representation 170 as presented to viewer 130 via display 145 according to some embodiments. As noted above, physical components 150 and 160 are viewable through display 145. Graphical representation 170 appears at a position in which a corresponding physical component is to be installed. According to the illustrated embodiment, display 145 also presents assembly information 175 which may assist in assembly of the product. Assembly information 175 indicates components to be assembled and a sequence in which the components are to be assembled, and may also describe tools or techniques which may assist the installation of certain components. Display 145 may present any other information or graphical representations to a viewer according to some embodiments.

Figure 3:
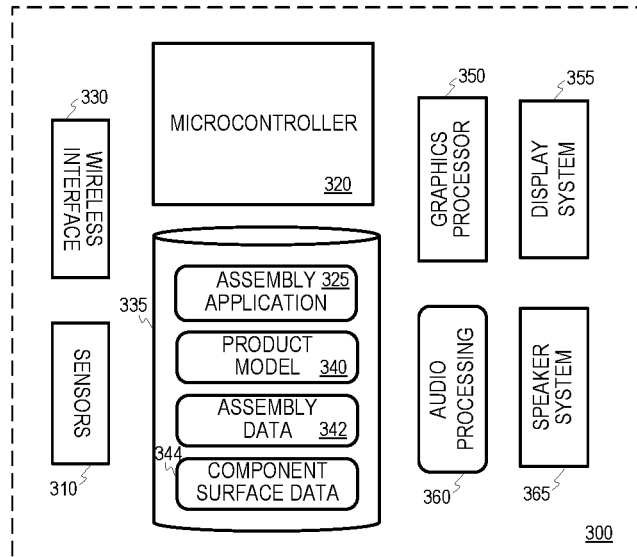
FIG. 3 is a functional block diagram of an AR headset according to some embodiments.

FIG. 3 is a functional block diagram of computing system 300 for executing the operations described herein. Each illustrated component of computing system 300 may be implemented using any combination of hardware and software. Computing system 300 is not limited to the illustrated components.

Computing system 300 may comprise an AR headset including a head-mounted display, but embodiments are not limited to an AR headset or to a head-mounted display. Embodiments are also not limited to a single computing device in that the operations described herein may be performed by different computing devices in some embodiments.

Sensors 310 may comprise any devices usable to sense a surrounding environment, including but not limited to one or more cameras, accelerometers, global positioning system receivers, infrared sensors, temperature sensors, microphones, vibration detectors, etc. Sensors 310 may operate to detect a marker placed at an initial position as described herein, and/or to detect a physical profile of a partially-completed product. Sensors 310 may also detect a position of computing system 300 within a frame of reference.

Microcontroller 320 may execute an operating system, firmware and applications to control operation of computing system 300. For example, microcontroller 320 may execute assembly application 325 stored in memory 335 to cause computing system 300 to execute the processes described herein. Memory 335 may store applications in addition to assembly application 325.

Memory 335 may comprise volatile and/or non-volatile memory, and may further store a product model 340, assembly data 342 and component surface data 344. Product model 340 may comprise a bill of materials for a particular instantiation of a product, as well as data describing physical interrelationships between the individual components of the product. Assembly data 342 may specify the order in which the components of the product instance are to be assembled, along with additional information (tools required, instructions, etc.) which may assist each step of the assembly. Component surface data 344 may include three-dimensional surface data of each component of the product.

Computing system 300 may receive applications and/or data from external sources via wireless interface 330. Wireless interface 330 may support one or more wireless protocols, including, for example, Wi-Fi and Bluetooth. Computing system 300 may also receive commands via wireless interface 330.

According to some embodiments, component surface data 344 comprises tessellated vertices and faces of each component. Component surface data 344 may be generated by a separate computing device based on a computer-aided design (CAD) model of the product and may occupy significantly less computer memory than the CAD model. Accordingly, component surface data 344 may be more suited than a corresponding CAD model of the product for storage and manipulation by a mobile device such as, for example, computing system 300.

Computing system 300 may also include graphics processor 350 to generate graphical representations of components as described herein. Such graphical representations may be presented by display system 355 such that the representations appear to be physically present in the surrounding physical environment. Display system 355 may comprise a transparent screen as described above or any other type of display system, including but not limited to a system in which the graphical representations are projected onto a viewer's eye(s). Audio processing component 360 may provide audio signals (e.g., spoken assembly instructions) to speaker system 365 for amplification and emission thereof. The emitted audio signals may be used to assist in determining the position of computing device 300 (e.g., via echo-location) within the surrounding environment.

Figure 4:
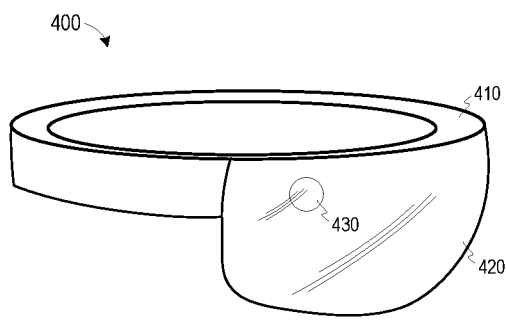
FIG. 4 is an outward view of an AR headset according to some embodiments.

FIG. 4 is a view of head-mounted AR device 400 according to some embodiments. Embodiments are not limited to the appearance or configuration of device 400. Device 400 consists of wearable housing 410 which may house and support many of the elements discussed above with respect to FIG. 3. Also shown are display 420 and camera 430. Device 400 displays images on display 420 such that the wearer (i.e., the viewer) may still view other objects within the surrounding environment. One or more of the presented images may be holographic.

Camera 430 may scan the surrounding environment for markers and/or other reference points to assist, along with the output of other sensors such as accelerometers, in determining a three-dimensional location and orientation (i.e., six degrees of freedom) of device 400 within the environment. Such scanning may include searching for an expected physical profile of a partially-assembled product as will be described below. The determined location and orientation are used to determine the size, position, orientation and visibility of graphical representations of components to be displayed to the viewer.

Figure 5A:
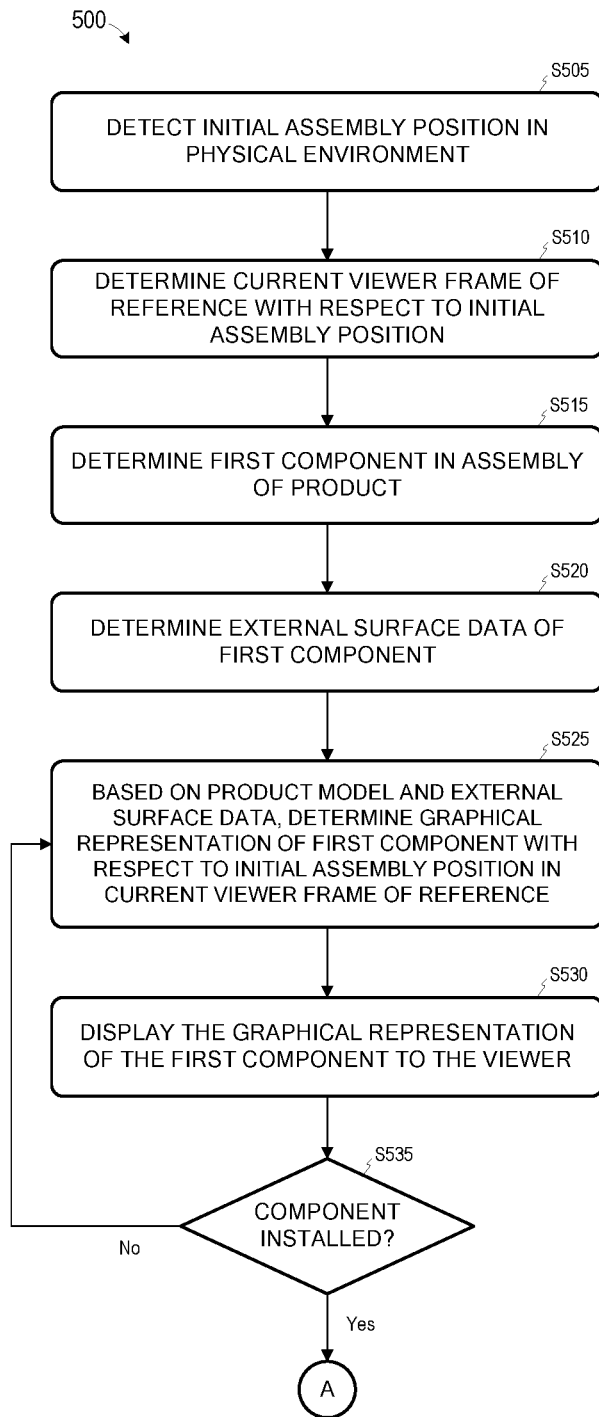
FIGS. 5A and 5B comprise a flow diagram of a process to position graphical views of components within an AR environment according to some embodiments.
Figure 5B:
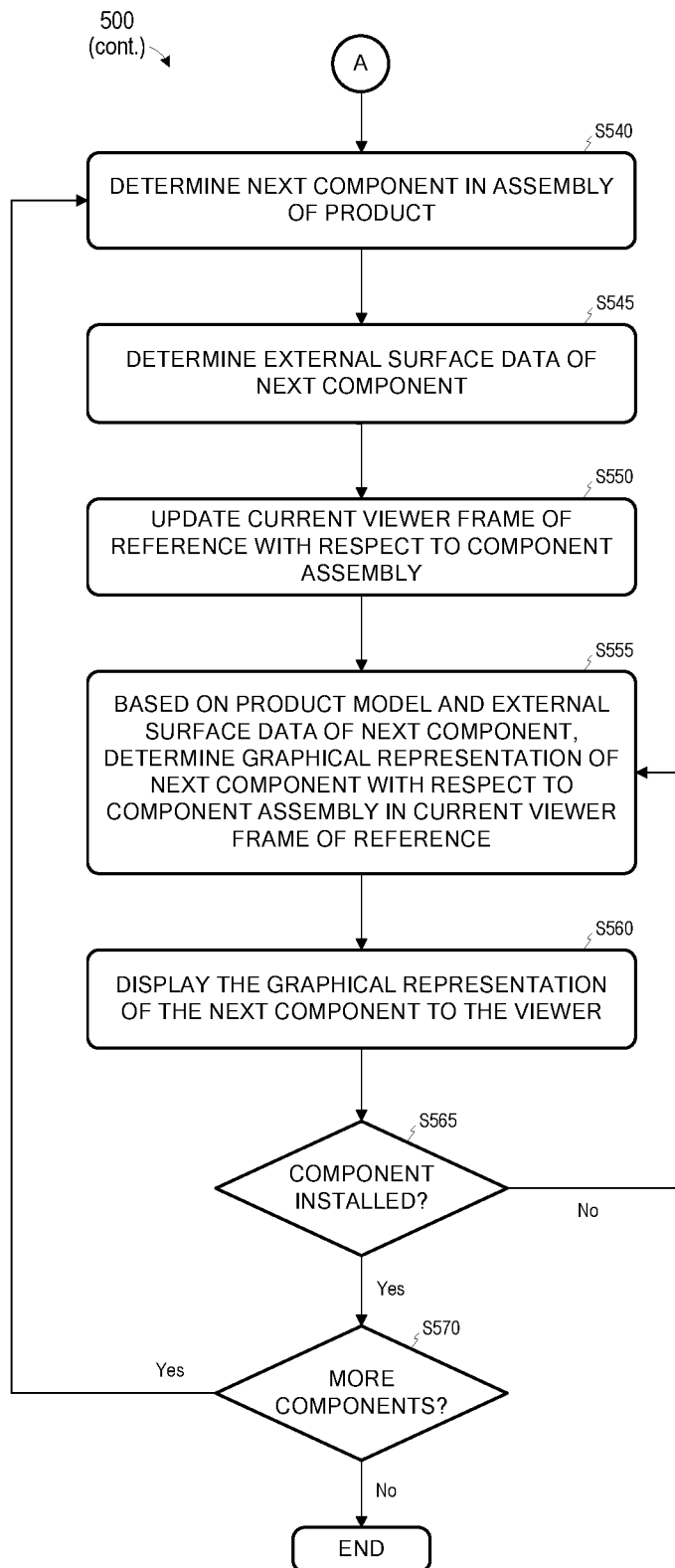

FIGS. 5A and 5B comprise a flow diagram of process 500 to position graphical views of components within an AR environment according to some embodiments. Process 500 and the other processes described herein may be performed using any suitable combination of hardware and software. Software program code embodying these processes may be stored by any non-transitory tangible medium, including a fixed disk, a volatile or non-volatile random access memory, a DVD, and a Flash drive, and executed by any number of processing units, including but not limited to processors, processor cores, and processor threads. Embodiments of process 500 are not limited to the examples described herein.

According to some embodiments, and prior to process 500, a user operates an AR device to initiate an assembly application such as assembly application 325. The AR device may be in communication with a backend system from which the assembly application fetches data associated with a product to be assembled. The data may include a product model, assembly data and component surface data as described above. Embodiments may support an "offline" mode in which process the product data is pre-stored on the AR device prior to initiation of the assembly application.

At S505, an initial assembly position within the surrounding physical environment is detected. The initial assembly position is intended to guide placement of a first component of the product as will be described below. In one example, the assembly application detects landmarks placed within the physical environment and triangulates to an initial assembly position based on a known relationship between the landmarks and the initial assembly position.

Figure 6:
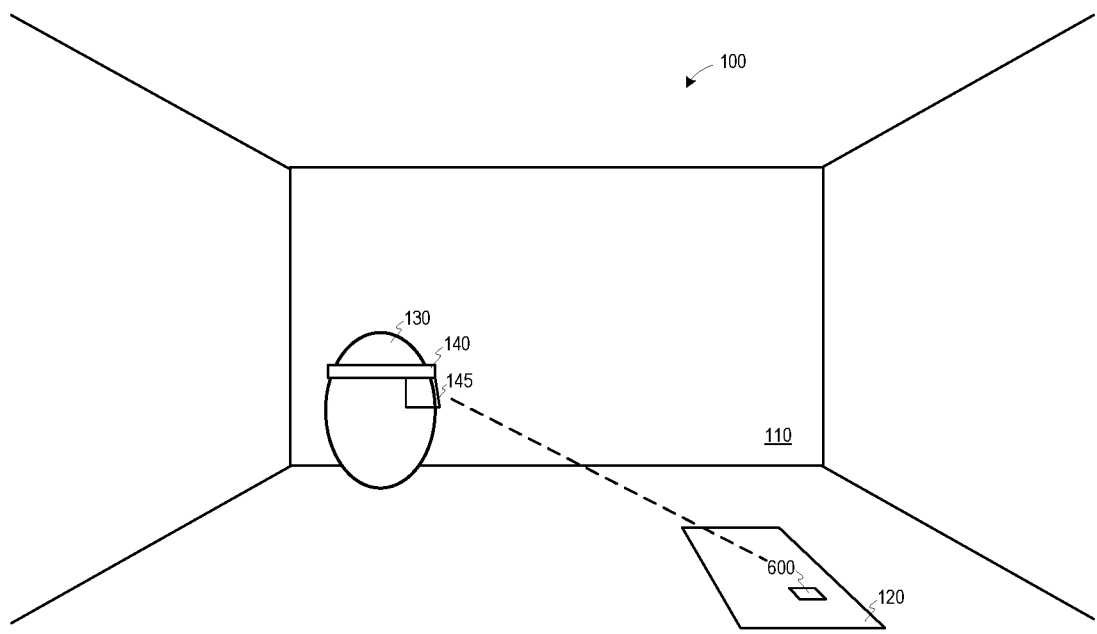
FIG. 6 is a view of a physical environment and an AR system according to some embodiments.

FIG. 6 illustrates S505 according to some embodiments. Base 120 is shown within physical environment 110 as described with respect to FIG. 1. As also described with respect to FIG. 1, viewer 130 wears AR headset 140 including display 145. Marker 600 is disposed upon base 120. Marker 600 may comprise a QR code, a piece of paper, reflective tape, or any other detectable item. S505 may comprise detection of a position of marker 600 by AR headset 140. The initial assembly position may be determined with respect to the position of marker 600. For example, the initial assembly position may be located at the geometric center of marker 600, at another location within the area of marker 600, or at a specified distance and direction from marker 600. In the latter case, the distance and direction may be specified by the stored product-related data.

A current frame of reference of the viewer with respect to the initial assembly position is determined at S510. The current frame of reference specifies a location and orientation of the AR device with respect to the initial assembly position. The current frame of reference with respect to the initial assembly position may be determined based on physical attributes of a marker detected at S505. That is, a size of the detected marker may indicate a current distance of the AR device from the marker and a shape or other attribute (e.g., orientation of printed indicia) of the marker may indicate a current orientation of the AR device with respect to the marker.

In some embodiments, the current frame of reference may be determined by detecting known external landmarks within environment 110, determining a location and orientation of AR device 140 with respect to the known external landmarks, and then determining a location and orientation of AR device 140 with respect to the initial assembly position based on a known relationship between the initial assembly position and the known external landmarks.

Next, at S515, a first component in the assembly of the product is determined. The first component may be determined from assembly data, which may have been generated by a manufacturing system based on a bill of materials specifying the components of the product. For example, the assembly data may point to an entry of the bill of materials to identify the first component. The identity of the first component is then determined from the bill of materials at S515.

External surface data of the first component is determined at S520. The external surface data may comprise three-dimensional component surface data as described above and may be determined based on an identifier of the first component determined at S515. The surface data may be significantly compressed with respect to corresponding CAD data of the component, including, for example, vertices of a three-dimensional frame of the component.

A graphical representation of the first component is determined at S525. The graphical representation is determined based on the product model and the determined external surface data, and is also determined in the current viewer frame of reference with respect to the initial assembly position. For example, the product model may indicate a position (i.e., location and orientation) of the first component with respect to the initial assembly position. Based on the indicated position of the first component with respect to the initial assembly position, and on the current viewer frame of reference with respect to the initial assembly position, a position of the first component in the current viewer frame of reference may be determined. With the position of the first component in the current viewer frame of reference now known, the external surface data may be used to generate a graphical representation of the first component which depicts how the first component would appear to the viewer at the current viewer position if it were properly positioned according to the product model.

The graphical representation of the first component is displayed to the viewer at S530. As described above, the graphical representation may be displayed using an AR system such that it appears overlaid onto the surrounding physical environment and in the correct position.

Figure 7:
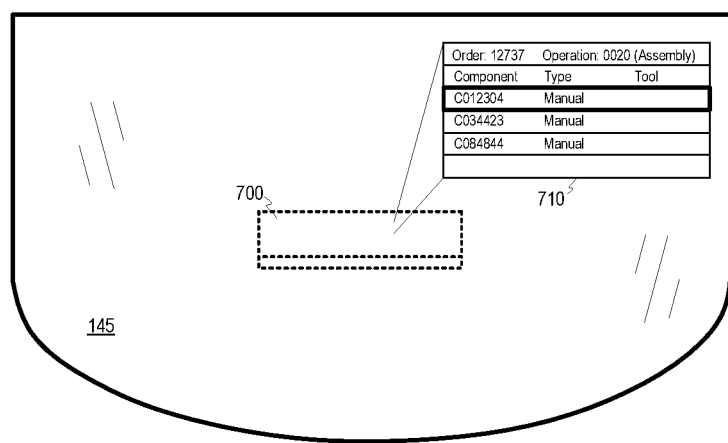
FIG. 7 is a view of an AR display presenting a virtual object within an AR environment according to some embodiments.

FIG. 7 illustrates an example of S530. As shown, graphical representation 700 is displayed by display 145 so as to appear within environment 110 and at a desired assembly position. Also shown is information 710 which provides additional assembly information as described above. Embodiments are not limited to a dotted line wireframe graphical representation as shown in FIG. 7. The graphical representation may include colored and/or shaded surfaces and or any other characteristic which may be suitable for the assembly process. A wireframe graphical representation may allow visibility of physical objects located "behind" the wireframe graphical representation. According to some embodiments, the graphical representation is animated, showing the component moving into proper position in the current viewer frame of reference.

The viewer attempts to install the first component after S530, using the displayed graphical representation and any other provided assembly information. It is determined at S535 whether the component has been installed and, if not, flow returns to S525 to determine a new graphical representation based on the now-current viewer frame of reference and to display the new graphical representation at S530. Cycling between S525, S530 and S535 compensates for movement of the viewer during installation of the component.

The determination at S535 may be based on an indication by the user that the component has been installed. For example, the user may input a "Next" or "Check Installation" command into the assembly application (using any suitable type of user input metaphor) to indicate that installation is complete. The determination at S535 may include a verification procedure which the user is directed to perform in order to ensure proper component installation. According to some embodiments, S535 includes scanning the physical profile of the installed component, determining a target physical profile of the component based on the product model, surface data and the current viewer frame of reference, and determining whether the scanned physical profile suitably matches the target physical profile.

According to some embodiments, the user scans an identifier associated with the actual physical component (e.g., a barcode printed on the component) prior to installation (e.g., prior to S520), and the assembly application confirms that the scanned identifier corresponds to the correct component. Process 500 may be halted until the correct identifier has been scanned.

Display of the graphical representation is terminated after it is determined at S535 that the first component has been installed. Flow then proceeds to S540.

A next component in the product assembly is determined at S540. The next component is determined in some embodiments based on the assembly information, which may be referred to as "routing". Again, the assembly information may refer to a component in the bill of materials of a product model, and S540 may therefore include determination of the referenced component in the bill of materials.

The external surface data of the next component is determined at S545. The external surface data may be determined as described above with respect to S520. Next, at S550, the frame of reference of the current viewer is updated. In particular, the frame of reference of the viewer is determined with respect to the current component assembly. According to some embodiments, S550 comprises determining a physical profile of the known current assembly of components (i.e., three-dimensional surface data of the components thus-far assembled) based on the product model and corresponding surface data. S550 may then include determination of the known position of the current component assembly with respect to the originally-detected (and now obscured) marker position.

Figure 8:
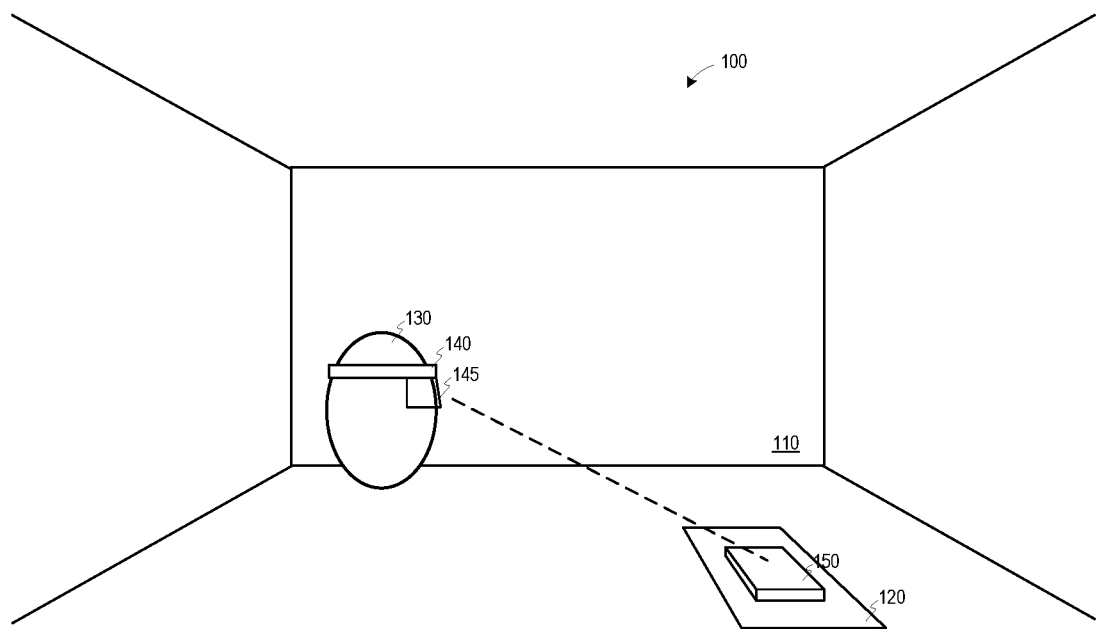
FIG. 8 is a view of a physical environment including physical objects and an AR system according to some embodiments.

In some embodiments of S550, the AR device may scan the current assembly of components to generate a three-dimensional mesh, which may be matched to a virtual mesh based on the surface data of the current assembly of components to determine the viewer frame of reference with respect to the component assembly. FIG. 8 illustrates scanning of installed component 150 at S550 according to some embodiments.

A graphical representation of the next component is determined at S555 with respect to the component assembly in the current viewer frame of reference. As described with respect to S525, the graphical representation is determined based on the product model and external surface data of the next component. Specifically, the product model may specify a desired physical relationship between the next component and the already-installed components, and the current viewer frame of reference assists in determining how the properly-installed next component would appear to the viewer.

Figure 9:
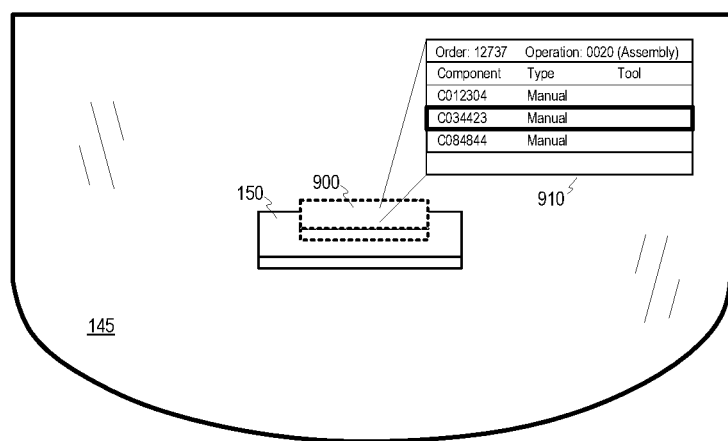
FIG. 9 is a view of an AR display presenting physical and virtual objects within an AR environment according to some embodiments.

The determined graphical representation is displayed to the user at S560. FIG. 9 shows graphical representation 900 of a next component as displayed by display 145 according to some embodiments. Graphical representation 900 is displayed so as to appear in a proper position with respect to actual physical component 150. Assembly information 910 is also displayed to assist in the installation of the corresponding component. In some embodiments, a graphical call-out pointing to the graphical representation may be displayed to assist in location of the component if it is obscured by already-assembled physical parts in the current viewer frame of reference.

Installation of the component is verified at S565. Verification of installation may proceed as described above or in any suitable manner. In some embodiments, flow cycles between S555, S560 and S565 until installation is verified to update graphical representation 900 based on any movement of the viewer.

Flow proceeds from S565 to S570 after installation is verified. At S570, it is determined whether additional components remain to be installed. This determination may be based on the assembly information. If so, flow returns to S540 and continues as described above for a next component.

Process 500 assumes that a marker indicative of an initial assembly position may be obscured by placement of the first component. Alternatively, in some embodiments, S515 to S535 may be repeated for subsequent components until the marker is obscured, at which point flow proceeds to S540 after S535 as described above.

Figure 10:
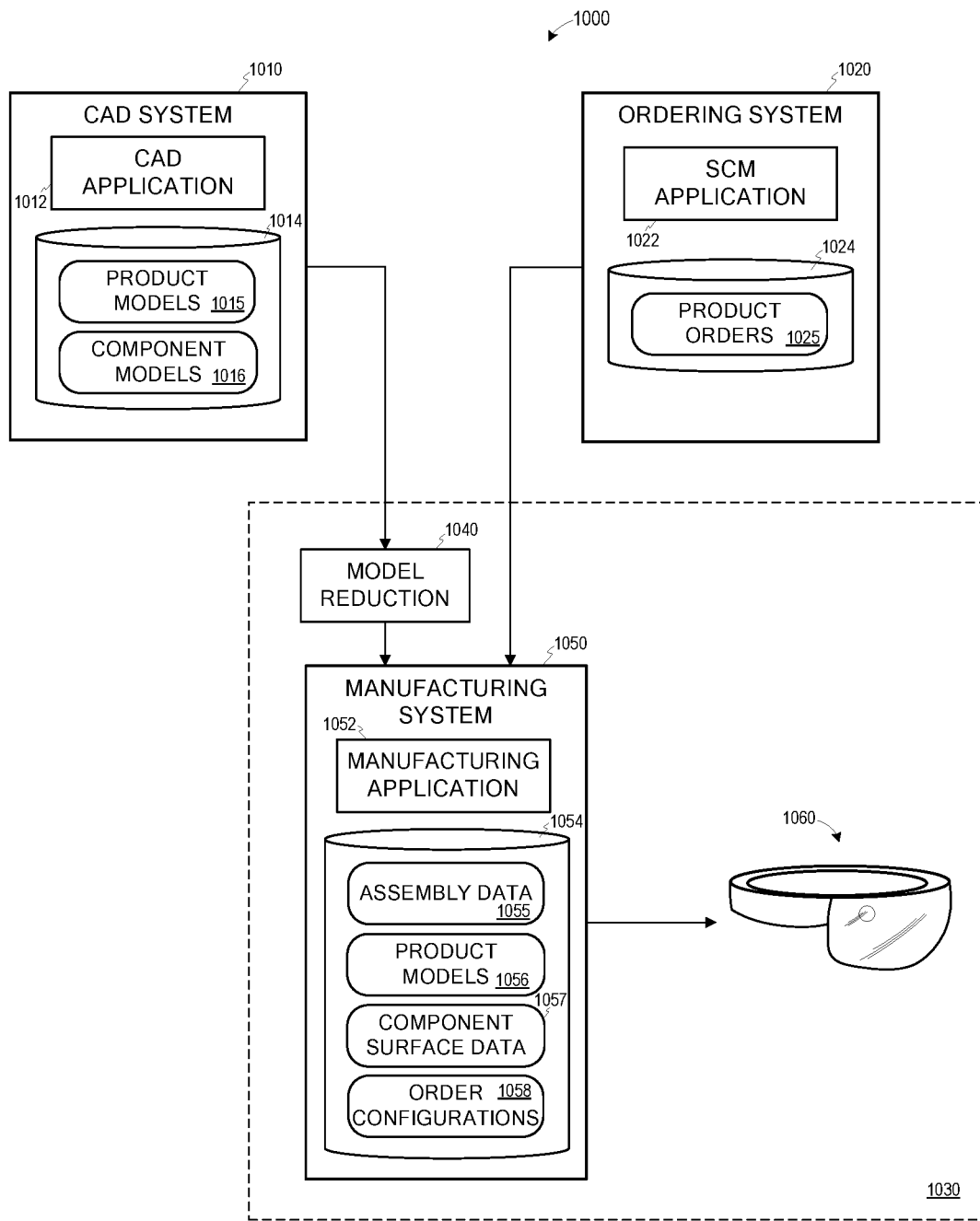
FIG. 10 illustrates integration of design, ordering and manufacturing systems to provide positioning of graphical views of components within an AR environment during product assembly according to some embodiments.

FIG. 10 illustrates architecture 1000 to facilitate integration of design, ordering and manufacturing according to some embodiments. Architecture 1000 includes CAD system 1010, ordering system 1020 and manufacturing system 1050, which may interoperate to provide positioning of graphical representations of components within an AR environment during product assembly. Each of systems 1010, 1020 and 1050 may comprise one or more computer servers including any suitable combinations of computer hardware and software in a standalone or distributed arrangement.

CAD system 1010 may execute CAD application 1012. One or more product designers may operate one or more client devices (not shown) to interact with CAD application 1012 as is known in the art to develop CAD product models 1015 and component models 1016. In the present example, component models 1016 include CAD data describing individual components of a product while product models 1015 include a bill of materials indicating each component of the product and data describing the physical relationships between individual components of the product. Although illustrated separately, the data described herein as product models 1015 and component models 1016 may reside together in one or more CAD files.

Ordering system 1020 according to the present example executes supply chain management application 1022. Supply chain management application 1022 may be employed to generate product orders 1025. Product orders 1025 may specify particular products to be manufactured and individual configuration details (e.g., a model number) of the particular products. As illustrated, ordering system 1020 may transmit a product order to manufacturing system 1050 to initiate manufacturing of a corresponding product.

Manufacturing system 1050 may be located in manufacturing environment 1030, in which AR device 1060 is also located. Embodiments are not limited to co-location of system 1050 and device 1060. Manufacturing system 1050 may receive product models 1015 and component models 1016 from CAD system 1010. Product models 1015 and/or component models 1016 may undergo any suitable transformation to facilitate usage thereof by manufacturing system 1050. For example, model reduction component 1040 may transform received component models 1016 into a format which preserves relevant metadata and identifiers and converts three-dimensional component surfaces into lightweight representations (e.g., vertices and faces). The transformed component models are stored in manufacturing system 1050 as component surface data 1057.

Manufacturing application 1052 of manufacturing system 1050 may be executed to allow an operator to generate assembly data 1055 for a given product. Assembly data 1055 may include a sequence of component assembly and tools, work instructions, and quality inspection data associated with various steps of the sequence.

According to some embodiments, manufacturing system 1050 receives order configurations 1058 from ordering system 1020. For a given order configuration 1058, manufacturing application 1052 retrieves a corresponding product model 1056, assembly data 1055 and component surface data 1057 and transmits the retrieved data to AR device 1060. AR device 1060 operates as described above to instruct assembly of the corresponding product using AR-presented graphical representations of the product components.

Figure 11:
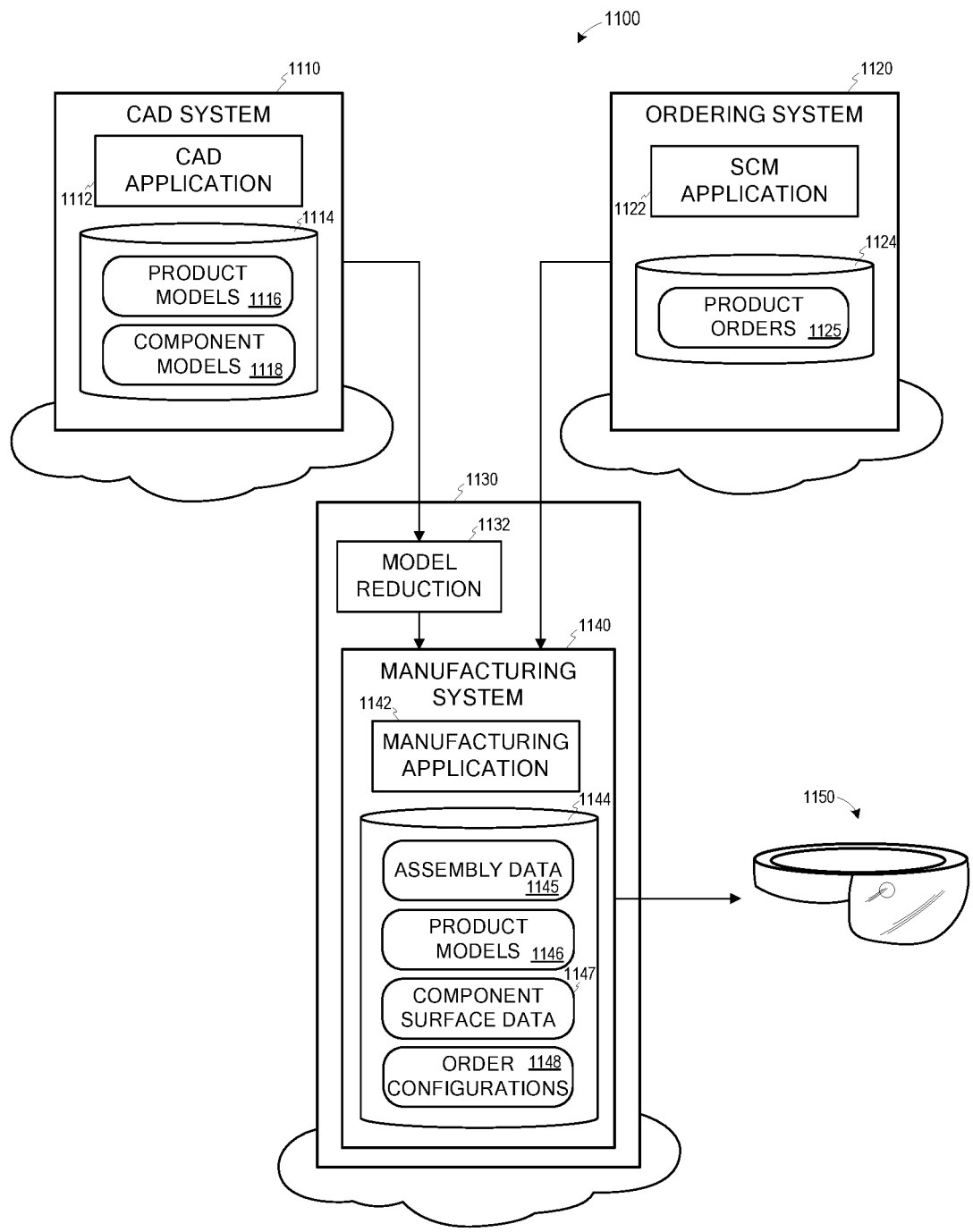
FIG. 11 illustrates integration of cloud-based design, ordering and manufacturing systems to provide positioning of graphical views of components within an AR environment during product assembly according to some embodiments.

Architecture 1100 of FIG. 11 is similar to architecture 1000, with each of CAD system 1110, ordering system 1120 and manufacturing system 1140 being depicted as a cloud-based service. Cloud-based implementations may allow client devices to access any of systems 1110, 1120 and 1140 via a Web connection and, more specifically, allow Web-based communication between AR device 1150 and manufacturing system 1140. Cloud-based implementations also provide resource elasticity and flexibility as is known in the art.

Figure 12:
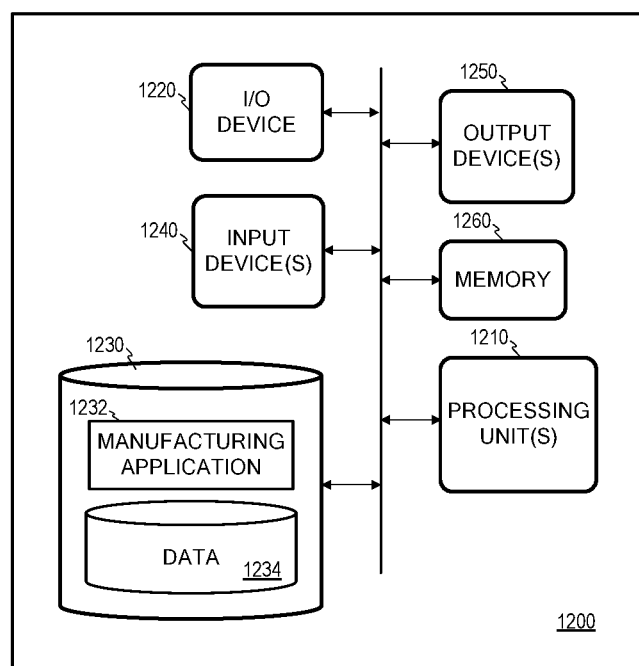
FIG. 12 is a block diagram of a manufacturing computing system according to some embodiments.

FIG. 12 is a block diagram of computing system 1200 providing a manufacturing system according to some embodiments. Computing system 1200 may comprise one or more general-purpose computing apparatuses and may execute program code to perform any of the functions described herein. For example, computing system 1200 may generate graphical representations of components as described herein and transmit the graphical representations to an AR device for display.

Computing system 1200 includes processing unit(s) 1210 operatively coupled to I/O device 1220, data storage device 1230, one or more input devices 1240, one or more output devices 1250 and memory 1260. I/O device 1220 may facilitate communication with external devices, such as an AR device, an external network, the cloud, or a data storage device. Input device(s) 1240 may comprise, for example, a keyboard, a keypad, a mouse or other pointing device, a microphone, knob or a switch, an infra-red (IR) port, a docking station, and/or a touch screen. Input device(s) 1240 may be used, for example, to enter information into system 1200. Output device(s) 1250 may comprise, for example, a display (e.g., a display screen) a speaker, and/or a printer.

Data storage device 1230 may comprise any appropriate persistent storage device, including combinations of magnetic storage devices (e.g., magnetic tape, hard disk drives and flash memory), optical storage devices, Read Only Memory (ROM) devices, and RAM devices, while memory 1260 may comprise a RAM device.

Manufacturing application 1232 may comprise program code executed by processing unit(s) 1210 to cause system 1200 to perform any one or more of the processes described herein. Embodiments are not limited to execution of these processes by a single computing device. Data 1234 may comprise product models, assembly information and component surface data as described herein. Data storage device 1234 may also store data and other program code for providing additional functionality and/or which are necessary for operation of computing system 1200, such as device drivers, operating system files, etc. Computing system 1200 may include other unshown elements according to some embodiments.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation some embodiments may include a processor to execute program code such that the computing device operates as described herein.

Embodiments described herein are solely for the purpose of illustration. Those in the art will recognize other embodiments may be practiced with modifications and alterations to that described above.

What is claimed is:

1. A system comprising:
    a display;
    a memory storing processor-executable program code;
    a processing unit to execute the processor-executable program code to cause the system to:
    determine a first component of a set of components under assembly;
    determine a first physical position of a user with respect to the first component;
    determine a second component of the set of components under assembly based on assembly information associated with the set of components;
    determine three-dimensional surface data of the second component;
    determine a physical relationship between the first component and the second component based on a model associated with the set of components;
    determine a graphical representation of the second component based on the first physical position of the user with respect to the first component, the physical relationship between the first component and the second component, and the three-dimensional surface data of the second component;

present the graphical representation to the user on the display in a view including the first component, wherein the presented graphical representation appears to the user to be in the physical relationship to the first component; and determine if the second component is installed in the set of components under assembly by:

determination of a target physical profile based on the three-dimensional surface data of the second component and three-dimensional surface data of the first component;

determination of a current physical profile of the set of components under assembly; and determination of whether the current physical profile matches the target physical profile.

2. A system according to claim 1, wherein determination of the first physical position of the user comprises:

determination of a current physical profile of the set of components under assembly; and searching of a physical environment for the current physical profile.

3. A system according to claim 2, wherein determination of the current physical profile comprises:

determination of a plurality of already-installed components of the set of components under assembly;

determination of surface data associated with each of the plurality of already-installed components;

determination of physical relationships between the plurality of already-installed components based on the model; and determination of the current physical profile based on the surface data associated with each of the plurality of already-installed components and the determined physical relationships between the plurality of already-installed components.

4. A system according to claim 1, the processing unit to execute the processor-executable program code to cause the system to:

determine a second physical position of the user with respect to the set of components under assembly;

determine a third component of the set of components under assembly based on the assembly information associated with the set of components;

determine three-dimensional surface data of the third component;

determine a second physical relationship between the third component and the second component based on the model associated with the set of components;

determine a second graphical representation of the third component based on the second physical position of the user with respect to the set of components, the second physical relationship between the second component and the third component, and the three-dimensional surface data of the third component; and present the second graphical representation to the user on the display in a view including the second component, wherein the presented second graphical representation appears to the user to be in the second physical relationship to the second component.

5. A method comprising:

determining a first component of a set of components under assembly in a physical environment;

determining a first physical position of a user with respect to the first component in the physical environment;

determining a second component of the set of components under assembly based on assembly information associated with the set of components;

determining three-dimensional surface data of the second component;

determining a physical relationship between the first component and the second component based on a model associated with the set of components;

determining a graphical representation of the second component based on the first physical position of the user with respect to the first component, the physical relationship between the first component and the second component, and the three-dimensional surface data of the second component;

presenting the graphical representation to the user in a view including the first component in the physical environment, wherein the presented graphical representation appears to the user to be in the physical relationship to the first component; and determining if the second component is installed in the set of components under assembly by:

determining a target physical profile based on the three-dimensional surface data of the second component and three-dimensional surface data of the first component;

determining a current physical profile of the set of components under assembly; and determining whether the current physical profile matches the target physical profile.

6. A method according to claim 5, wherein determining the first physical position of the user comprises:

determining a current physical profile of the set of components under assembly; and searching the physical environment for the current physical profile.

7. A method according to claim 6, wherein determining the current physical profile comprises:

determining a plurality of already-installed components of the set of components under assembly;

determining surface data associated with each of the plurality of already-installed components;

determining physical relationships between the plurality of already-installed components based on the model; and determining the current physical profile based on the surface data associated with each of the plurality of already-installed components and the determined physical relationships between the plurality of already-installed components.

8. A method according to claim 5, further comprising:

determining a second physical position of the user with respect to the set of components under assembly in the physical environment;

determining a third component of the set of components under assembly based on the assembly information associated with the set of components;

determining three-dimensional surface data of the third component;

determining a second physical relationship between the third component and the second component based on the model associated with the set of components;

determining a second graphical representation of the third component based on the second physical position of the user with respect to the set of components, the second physical relationship between the second component and the third component, and the three-dimensional surface data of the third component; and presenting the second graphical representation to the user in a view including the second component, wherein the presented second graphical representation appears to the user to be in the second physical relationship to the second component in the physical environment.

9. A non-transitory computer-readable medium storing processor-executable program code, the program code executable by a processor to cause a system to:
   determine a first component of a set of components under assembly;
   determine a first physical position of a user with respect to the first component;
   determine a second component of the set of components under assembly based on assembly information associated with the set of components;
   determine three-dimensional surface data of the second component;
   determine a physical relationship between the first component and the second component based on a model associated with the set of components;
   determine a graphical representation of the second component based on the first physical position of the user with respect to the first component, the physical relationship between the first component and the second component, and the three-dimensional surface data of the second component;
   present the graphical representation to the user in a view including the first component, wherein the presented graphical representation appears to the user to be in the physical relationship to the first component; and
   determine if the second component is installed in the set of components under assembly by:
   determination of a target physical profile based on the three-dimensional surface data of the second component and three-dimensional surface data of the first component;
   determination of a current physical profile of the set of components under assembly; and
   determination of whether the current physical profile matches the target physical profile.

10. A medium according to claim 9, wherein determination of the first physical position of the user comprises:
   determination of a current physical profile of the set of components under assembly; and
   searching of a physical environment for the current physical profile.

11. A medium according to claim 10, wherein determination of the current physical profile comprises:
   determination of a plurality of already-installed components of the set of components under assembly;
   determination of surface data associated with each of the plurality of already-installed components;
   determination of physical relationships between the plurality of already-installed components based on the model; and
   determination of the current physical profile based on the surface data associated with each of the plurality of already-installed components and the determined physical relationships between the plurality of already-installed components.

12. A medium according to claim 9, the program code executable to cause a system to:
   determine a second physical position of the user with respect to the set of components under assembly;
   determine a third component of the set of components under assembly based on the assembly information associated with the set of components;
   determine three-dimensional surface data of the third component;
   determine a second physical relationship between the third component and the second component based on the model associated with the set of components;
   determine a second graphical representation of the third component based on the second physical position of the user with respect to the set of components, the second physical relationship between the second component and the third component, and the three-dimensional surface data of the third component; and
   present the second graphical representation to the user in a reality view including the second component, wherein the presented second graphical representation appears to the user to be in the second physical relationship to the second component.

* * * * *